(12) United States Patent
Ainsworth et al.

(10) Patent No.: US 7,139,910 B1
(45) Date of Patent: *Nov. 21, 2006

(54) SYSTEMS AND METHODS FOR OBTAINING DIGITAL SIGNATURES ON A SINGLE AUTHORITATIVE COPY OF AN ORIGINAL ELECTRONIC RECORD

(75) Inventors: Scott G. Ainsworth, Virginia Beach, VA (US); Charles F. Hawkins, Virginia Beach, VA (US); Donald J. Plaster, Virginia Beach, VA (US)

(73) Assignee: Compass Technology Management, Inc., Chesapeake, VA (US)

( * ) Notice: Subject to any disclaimer, the term of this patent is extended or adjusted under 35 U.S.C. 154(b) by 836 days.

This patent is subject to a terminal disclaimer.

(21) Appl. No.: 10/086,203

(22) Filed: Feb. 28, 2002

Related U.S. Application Data

(63) Continuation-in-part of application No. 09/993,132, filed on Nov. 14, 2001.

(51) Int. Cl.
*H04L 9/00* (2006.01)

(52) U.S. Cl. ..................................... 713/155; 713/181
(58) Field of Classification Search ................ 713/155, 713/181; 726/27
See application file for complete search history.

(56) References Cited

U.S. PATENT DOCUMENTS

| | | | | |
|---|---|---|---|---|
| 5,347,581 A | * | 9/1994 | Naccache et al. | 380/30 |
| 5,615,268 A | | 3/1997 | Bisbee et al. | 380/25 |
| 5,633,931 A | * | 5/1997 | Wright | 713/161 |
| 5,659,616 A | | 8/1997 | Sudia | 380/23 |
| 5,673,316 A | | 9/1997 | Auerbach et al. | 380/23 |
| 5,748,738 A | * | 5/1998 | Bisbee et al. | 713/176 |
| 6,212,281 B1 | * | 4/2001 | Vanstone | 380/282 |
| 6,237,096 B1 | * | 5/2001 | Bisbee et al. | 713/178 |

* cited by examiner

*Primary Examiner*—Emmanuel L. Moise
*Assistant Examiner*—Ali Abyaneh
(74) *Attorney, Agent, or Firm*—Bowman Green Hampton & Kelly, PLLC

(57) ABSTRACT

The invention includes systems and methods for maintaining control of an electronic record, which may have transferable value, wherein a user may add digital signature information to a single unique authoritative copy of the electronic record held in a repository without compromising the uniqueness of the authoritative electronic record. Provided the digital signature information is valid, an authoritative electronic record may be amended to include multiple digital signatures, while continuing to be a single unique authoritative electronic record.

35 Claims, 8 Drawing Sheets

SYSTEMS AND METHODS FOR OBTAINING DIGITAL SIGNATURES ON A SINGLE AUTHORITATIVE COPY OF AN ORIGINAL ELECTRONIC RECORD

CROSS-REFERENCE TO RELATED APPLICATIONS

This is a Continuation-in-Part of U.S. patent application Ser. No. 09/993,132, filed Nov. 14, 2001, the entire disclosure of which is incorporated herein by reference.

BACKGROUND OF THE INVENTION

1. Field of Invention

This invention relates generally to the field of computer security, and more specifically to electronic records and digital signatures.

2. Description of Related Art

In business transactions, it is generally known that by physically producing a "blue ink" signature, or a signature made by a person using an ink pen, on a physical record, the signer can enter a legally-binding agreement, provided both parties involved in the transaction have agreed that the existence of a signature in a particular area or areas of the physical record constitutes agreement by the signer to the terms contained within the physical record. Thus, the terms outlined in the signed physical record may be legal and enforceable.

Modern technology has profoundly changed the way business transactions are conducted today. The use of computers and other data processing devices is commonplace in both large and small businesses. The connectivity provided by intranets and the Internet has reduced information transfer times from days to seconds, and transferring documents electronically eliminates postage and shipping charges. For a reasonable investment, a small business or organization can acquire communication benefits similar to those of large high-technology corporations.

Many government agencies have taken advantage of the cost and time savings benefits offered by electronic communications, and the filing of electronic documents will soon be the preferred, if not required, method of filing certain documents with certain U.S. government agencies.

Nevertheless, electronic records, which are generated, transmitted, received, or stored by electronic means, can be modified or forged. Furthermore, the true origin of an electronic communication can be concealed or faked. Thus, cryptography systems and methods have been developed that attempt to help a recipient verify that a received electronic communication, such as, for example, an e-mail, was actually transmitted from the claimed sender, and that the content of the received electronic communication is an accurate representation of the message transmitted by the sender.

Likewise, systems and methods have been developed that attempt to validate electronic transactions, such as credit card purchases over the Internet. Typically, these systems involve the use of a digital signature (sometimes referred to as an electronic signature) that can be added to an electronic record to authenticate the identity of the sender of the record or the signer of the record, and verify that the received electronic record is a true and accurate representation of what the sender transmitted. Ultimately, the goal of these systems and methods is to produce a system and method whereby a signer's digital signature on an electronic record is given the same legal enforceability as a blue ink signature on a physical record.

Generally, an electronic signature is an electronic sound, symbol, or process attached to or logically associated with a contract or other record and executed or adopted by a person with the intent to sign the record. A digital signature is a form of electronic signature, generated by computer hardware or software and represented in a computer as a string of binary digits. The methods of producing a digital signature involve a set of rules and a set of parameters such that the digital signature produced is unique and verifiable, and such that both the identity of the signatory (person represented by the digital signature) and the integrity of the data (the binary bits which were signed) can be verified.

Traditional cryptography has usually involved the creation and sharing of a secret key for the encryption and/or decryption of a message. Unfortunately, if the secret key is discovered or intercepted by someone else, the message can easily be decrypted. Thus, use of a Public Key Infrastructure (PKI) or Public Key Cryptography (PKC) system is generally preferred.

A PKC system is an asymmetric encryption system, meaning that it employs two "keys", which are created simultaneously using the same algorithm by a public-private key issuing authority. A public key is made publicly available (as part of a digital certificate) in a directory that all parties can access, and is used to encrypt an electronic record or verify a digital signature. A private key is kept private, secret, and never shared with anyone or transmitted across the Internet, and is used to generate a digital signature or decrypt an encrypted electronic record. Each person involved in an electronic transaction based on the private and public key method of digital signature generation and verification will possess a private and public key pair. Anyone can verify a person's digital signature by using that person's public key (which can be found in a public directory), but only the possessor of a person's private key may generate a digital signature. PKC systems permit the user's public key to be posted, in a directory or on a bulletin board for example, without compromising the user's private key. This public key concept simplifies the key distribution process.

Asymmetric systems adhere to the principle that knowledge of one key (the public key) does not permit derivation of the second key (the private key) because finding large prime numbers is computationally easy but factoring the products of two large prime numbers is computationally infeasible. Examples of PKC algorithms are the Digital Signature Algorithm (DSA) (Federal Information Processing Standards Publication 186, 1994, "FIPS PUB 186," and its successors), and the Rivest, Shamir, and Adleman (RSA) algorithm, as specified in Internet Engineering Task Force (IETF) Request for Comments (RFC) 2347 and its successors.

When dealing with an electronic record, such as an e-mail message, a sender may, for example, digitally "sign" the electronic record using the PKC system. When digitally signing an electronic record using a PKC system, the sender does not merely add his or her digital signature to the electronic record as he or she would a "blue ink" signature. Instead of using a "blue ink" signature, a message digest of the electronic record (a statistically-unique mathematical "summary" of the electronic record), is first generated using special software.

The message digest is a compressed representation of the original electronic record, but is usually much smaller than the electronic record on which it is based. Message digests may be produced using standard, published, one-way hashing algorithms, and message digests produced by the same algorithm are generally the same length in bits. The message digest will be considered a unique representation of the electronic record because it is computationally infeasible for the same message digest function to produce the same message digest for two different electronic records. Therefore, the use of a message digest as a representation of the electronic record is considered valid.

Message digest algorithms currently available, such as MD-2, MD-4, MD-5, SHA-1, and SHA-256, are hashing algorithms that create message digests by iteratively performing computations on specific portions of the electronic record (512 bits or 1024 bits). The result of each iteration is combined with the result from the previous iteration forming a "chain" of interim values, thus these interim values are called chain values. The initial chain value is called the seed value and is a predefined, constant value (the actual value depends on the particular message digest algorithm being used). For SHA-1, as an example, five 32-bit chain values are produced for each 512 bits of data. A full history of PKC systems is described in W. Diffie's, "The First Ten Years of Public-Key Cryptography", which is incorporated herein by reference.

Once the message digest has been produced, the sender's private key (an asymmetric private key, which the sender usually obtains from the public-private key issuing authority) is used to cryptographically create a digital signature from the message digest. Because of the manner by which the sender's digital signature is obtained, the sender's digital signature will be different each time he or she sends a different e-mail message.

When the electronic record with the sender's digital signature is received by a recipient, the digital signature is verified using the electronic record and the sender's public key. If the digital signature is valid, the recipient knows that the sender's private key was used to sign the electronic record.

In addition to encrypting an electronic record, a sender may be authenticated by the receiver by using the private key to encrypt some data. When the receiver receives the encrypted data, he can use the sender's public key, which resides in the sender's publicly available digital certificate, to decrypt it. PKC can also be used to generate a digital signature to authenticate a signer. The signer creates a message digest of the electronic record. After generating the message digest, the signer creates a digital signature from the message digest with his private key. The receiver, upon receiving the digital signature and computing the message digest of the electronic record, uses the signer's public key, which resides in the signer's publicly available digital certificate, to verify the signature. This operation validates the identity of the signer because he is the only person who can sign the message with his private key.

Thus, a PKI enables users of a basically unsecured public network, such as the Internet, to securely and privately exchange digital information through the use of a public and a private cryptographic key pair that is obtained and shared through a trusted authority. Varieties of products are offered by, for example, RSA®, Verisign®, GTE CyberTrust®, Xcert®, or Netscape®, which enable a user to implement a PKI. While there is no universal standard for PKI, the public key infrastructure generally presumes the use of Public Key Cryptography (PKC), which is the most common method on the Internet for authenticating a message sender or encrypting a message.

In addition to the PKC method, encryption may be accomplished by the symmetric algorithm method. An example of this is the Data Encryption Standard (DES), which is described in Data Encryption Standard, Federal Information Processing Standards Publication 46 (1977) ("FIPS PUB 46," and its successors), which is available from the U.S. Department of Commerce. In general, a symmetric cryptographic system is a set of instructions, implemented in hardware, software, or both, that can convert plain text into ciphertext, and vice versa. In a private key system (sometimes known as a symmetric cryptographic system), a specific key is used that is known to the users but is kept secret from others.

Computers and other electronic devices, such as Personal Digital Assistants (PDA) and cellular telephones, provide the interface terminals from which parties to a business transaction may take advantage of the many benefits of electronic transactions. One of the primary benefits of validating electronic transactions is the ability to transact business with a person, or groups of people, anywhere in the world, since electronic transactions can take place over telephone lines, computer networks, and through the air via cellular and satellite communication systems.

In recognition of the general acceptance of using electronic communications in the business place, laws regulating electronic communications have begun to be developed and adopted. In effect since Oct. 1, 2000, the Electronic Signatures in Global and National Commerce Act (often referred to as the e-signature law or e-Sign) specifies that in the United States, the use of a digital signature on an electronic record is as legally binding as a traditional handwritten signature written in ink on paper. The purpose of this and other laws, such as the Uniform Electronic Transactions Act (UETA), is to validate the authenticity of electronic transactions, to legally bind parties to a digitally signed contract, and to provide a legal framework for enforcement of electronically signed documents. Thus, digital signatures allow parties to conduct electronic business transactions that were previously limited to paper with handwritten signatures.

SUMMARY OF THE INVENTION

However, digital signatures require some connection between a potential signatory and the electronic record, usually a networked computer. For example, when an individual places a blue ink signature on a printed agreement, the person is holding a piece of paper in his or her hands and is actually writing on the paper with a pen. When an individual use a computer he or she is, in most cases, positioning a pointer on a screen, pressing a button on a mouse, and trusting that the electronic record he or she is viewing on the screen is an accurate representation of the electronic record he or she is digitally signing.

Unfortunately, some known systems and methods for transferring electronic records and allowing digital signatures to be affixed to the electronic records do not provide a sufficient level of confidence that once a user's digital signature is affixed to the electronic record, the electronic record will not be altered. Also, some current systems and methods may produce multiple duplicate electronic records.

Accordingly, this invention utilizes systems and methods, which provide a secure and legally enforceable electronic transaction by providing for the secure maintenance and control of an electronic record. This invention utilizes systems and methods which provide a unique copy of an electronic record.

The systems and methods of this invention for obtaining digital signatures on a single authoritative copy of an electronic record utilize a repository connected, via a network, to at least one remotely located computer. In various exemplary embodiments, the repository represents a secure environment in which electronic records may be maintained. It should be appreciated that the repository utilizes sufficient security methods to ensure safe storage and integrity of the electronic records and is capable of storing and executing at least one software program.

During operation of one exemplary embodiment of the systems and methods for obtaining digital signatures on a single authoritative copy of an electronic record according to this invention, an electronic record is first received in the repository. Once the electronic record is received in the repository, first receipt information is generated and prepended at a beginning portion of the electronic record. The first receipt information includes information relating to the electronic record.

Next, first identifying information is generated and appended at an end portion of the electronic record. The first identifying information includes a provable representation of the first receipt information and may also include, for example, a time and/or date stamp or other information for identifying the original electronic record. The electronic record, with the prepended first receipt information and the appended first identifying information is then stored in the repository as an authoritative electronic record.

The authoritative electronic record remains in the repository until a request is received to review and optionally sign the authoritative electronic record at one of the remote locations. When such a request is received, a partial message digest related to a proper subset of the authoritative electronic record as well as a complement of the proper subset of the authoritative electronic record are computed at the repository. Note that a partial message digest is a partially completed message digest, that is, a message digest which has not yet been fully computed but has only been computed over a portion ("proper subset") of a record and must still be eventually completed using the rest ("complement of the proper subset") of the record.

It should be understood that the complement of proper subset of the authoritative electronic record is equivalent to the original electronic record and all of the appended identifying information, and constitutes a copy of the authoritative electronic record. Similarly, the proper subset of the authoritative electronic record includes all of the information prepended to the electronic record, such as, for example, the receipt information and any digital signature information.

Once these actions are completed, the partial message digest and the complement of the proper subset of the authoritative electronic record are transmitted, via the network, to the remote location.

After the transmitted data is received at the remote location, a message digest is completed at the remote location, using the partially completed message digest and the complement of the proper subset of the authoritative electronic record. The complement of the proper subset of the authoritative electronic record is displayed at the remote location, so that a potential signatory may review the complement of the proper subset of the authoritative electronic record. If the potential signatory, upon review of the complement of the proper subset of the authoritative electronic record, decides to digitally sign the electronic record, he executes his digital signature and the appropriate digital signature information is computed using the completed message digest and a private key.

After the digital signature information is computed, it is sent to the repository. Then, the digital signature information is verified, as described above, to determine whether the digital signature information represents a valid digital signature. If it is determined that the digital signature information represents a valid digital signature, the authoritative electronic record in the repository is amended to include the digital signature information.

Once the authoritative electronic record has been amended, at least some receipt information, which will be referred to as signature receipt information, is generated and prepended at a beginning portion of the signed authoritative electronic record. As with the first receipt information, which includes information relating to the original electronic record, the signature receipt information includes information relating to the signed authoritative electronic record. Next, at least some identifying information, which will be referred to as signature receipt identifying information, is generated and appended at an end portion of the signed authoritative electronic record. As with the first identifying information, which includes a provable representation of the first receipt information, the signature receipt identifying information includes a provable representation of the signature receipt information.

In various exemplary embodiments, the authoritative electronic record in the repository is replaced by the signed authoritative electronic record (plus the prepended signature receipt information and the appended signature receipt identifying information), such that the signed authoritative electronic record (plus the extra prepended and appended information) becomes the authoritative electronic record.

Thus, the systems and methods of this invention provide a single, unique authoritative electronic record.

The systems and methods of this invention ensure that copies of the authoritative electronic record are easily distinguished as copies of the authoritative electronic record.

The systems and methods of this invention allow a signatory to digitally sign an electronic record at a remote location without compromising the uniqueness of a corresponding authoritative electronic record that is stored in the repository.

The systems and methods of this invention allow an authoritative electronic record to be amended in a manner that is secure, verifiable, and allows for verification of the involved parties.

The systems and methods of this invention allow a complement of the proper subset of the authoritative electronic record to be transmitted to, displayed at, printed at, saved at, and/or transmitted from, a remote location without compromising the integrity of the authoritative electronic record which is stored in the repository.

These and other features and advantages of this invention are described in or are apparent from the following detailed description of various exemplary embodiments of the apparatuses, systems, and methods of this invention.

BRIEF DESCRIPTION OF THE DRAWINGS

Exemplary embodiments of the systems and methods according to this invention will be described in detail, with reference to the following figures, wherein.

DETAILED DESCRIPTION OF PREFERRED EMBODIMENTS

For simplicity and clarification, the operating principles, design factors, and layout of the systems and methods for obtaining digital signatures on a single authoritative copy of an original electronic record, according to this invention, are explained with reference to various exemplary embodiments of the systems and methods for obtaining digital signatures on a single authoritative copy of an original electronic record, according to this invention. The basic explanation of the operation of the systems and methods for obtaining digital signatures on a single authoritative copy of an original electronic record is applicable for the understanding and design of the constituent components and steps employed in the systems and methods for obtaining digital signatures on a single authoritative copy of an original electronic record according to this invention.

Furthermore, for the sake of simplicity, the terms electronic and digital will be used. It should be understood that, for purposes of this invention, the terms electronic and digital will be used as essentially interchangeable terms. Additionally, various embodiments of this invention will be described with reference to a repository. However, it should be appreciated that the term "repository" is for a basic explanation and understanding of one of the constituent components of the systems and methods for obtaining digital signatures on a single authoritative copy of an original electronic record of this invention. Therefore, the term "repository" is not to be construed as limiting this invention, but should be understood to represent a secure environment in which original electronic records may be maintained. It should be appreciated that the repository utilizes sufficient security methods to ensure safe storage and integrity of the original electronic records and is capable of storing and executing at least one software program.

Figure 1:
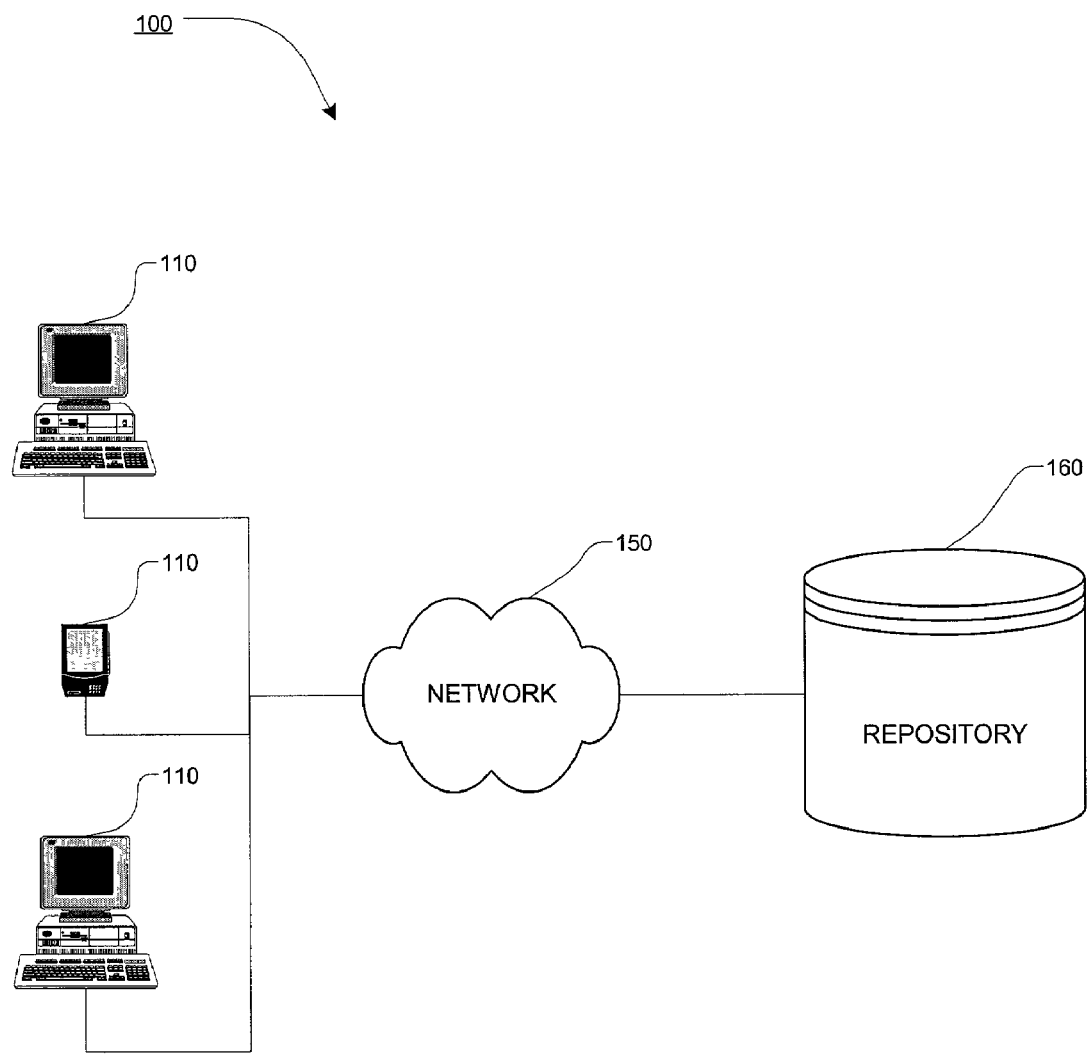
FIG. 1 shows a functional block diagram outlining a first exemplary embodiment of a system for obtaining digital signatures on an authoritative electronic record, according to this invention.

FIG. 1 shows a functional block diagram outlining a first exemplary embodiment of a system for obtaining digital signatures on an authoritative electronic record 100 (hereinafter "system 100"), according to this invention. As shown in FIG. 1, the system 100 includes a plurality of remote locations 110. Each remote location 110 is linked to a network 150, and, in turn, to a repository 160.

In various exemplary embodiments, each remote location 110 includes a device capable of receiving, displaying, and transmitting an electronic record, such as a personal computer, laptop computer, personal digital assistant (PDA), cellular telephone, and the like.

In various exemplary embodiments, the network 150 is a distributed network, such as, for example, an intranet, an extranet, the Internet, a local area network (LAN), a wide area network (WAN), or any other presently known or later developed distributed network or other means over which an electronic record may be transmitted.

Typically, the repository 160 comprises one or more secure servers and sufficient software for ensuring the integrity of original electronic records therein.

In the various exemplary embodiments described herein, the remote locations 110 interface, for example, with the network 150, or the repository 160 on the network 150, via a wired connection. Alternatively, the remote location 110 can interface with the network 150 or the repository 160 on the network 150 via any linked connection. The linked connection can be any known or later developed device or system for connecting the remote location 110 to the network 150 or to the repository 160 on the network 150, including a direct wired connection, a connection over a LAN, a WAN, or any other distributed network, a connection over the public switched telephone network, a connection over a coaxial cable (i.e., CATV) system, a connection over a cellular telephone network, a satellite connection or the like. In general, the linked connection can be any known or later developed connection system or structure usable to connect the remote location 110 to the network 150 or the repository 160 on the network 150, including both wired and wireless connections.

Figure 2:
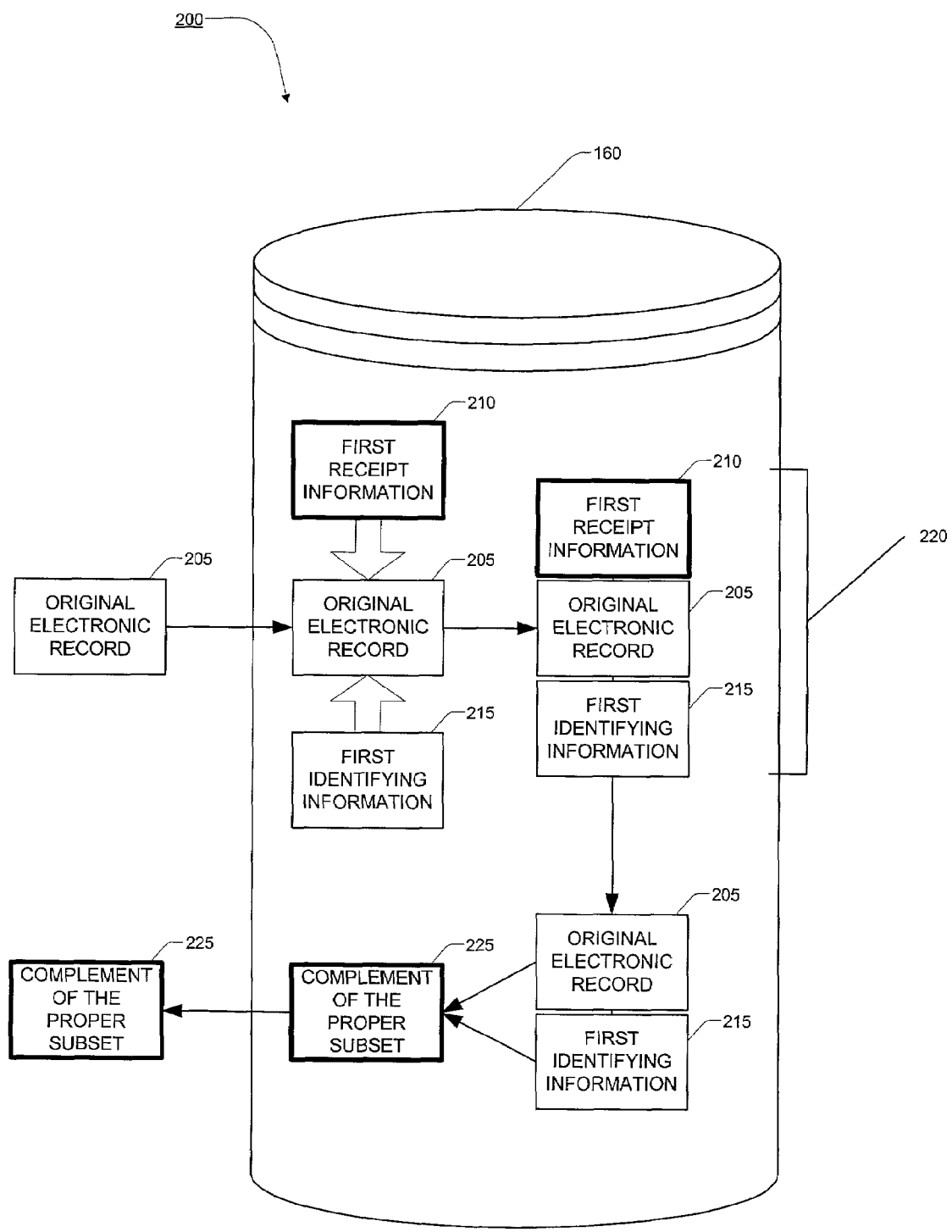
FIG. 2 shows a functional block diagram outlining a first exemplary embodiment of a method for receiving an original electronic record at a repository, generating an authoritative electronic record in the repository, computing a complement of the proper subset of the authoritative electronic record in the repository, and transmitting the complement of the proper subset of the authoritative electronic record to a remote location, according to this invention.

FIG. 2 shows a functional block diagram 200, outlining a first exemplary embodiment of a method for receiving an original electronic record at a repository, generating an authoritative electronic record in the repository, computing a proper subset and a complement of the proper subset of the authoritative electronic record in the repository, and transmitting the complement of the proper subset of the authoritative electronic record to a remote location 110, according to this invention. As shown in FIG. 2, an original electronic record 205 initially is transmitted from a remote location 110 to the repository 160.

Figure 3:
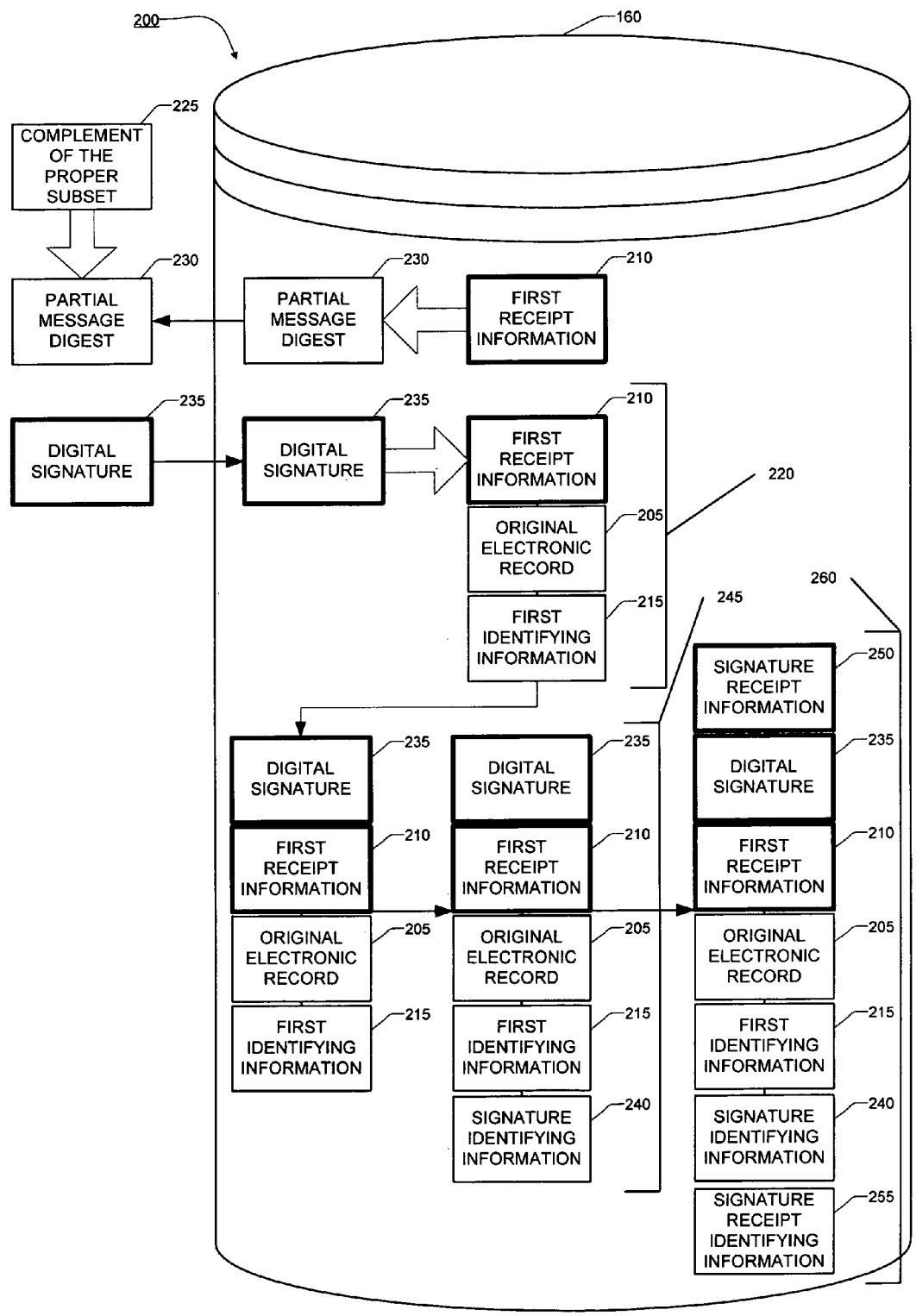
FIG. 3 is a functional block diagram outlining a first exemplary embodiment of a method for digitally signing an authoritative electronic record using a partial message digest computed at the repository from a proper subset of the authoritative electronic record and sent to the remote location and a complement of the proper subset, which is also sent to the remote location, at a remote location, transmitting that digital signature to the repository, and having the repository verify the digital signature and amend the authoritative electronic record, according to this invention.

When the original electronic record 205 is received by the repository 160, at least some first receipt information 210 is generated and prepended at a beginning portion of the original electronic record 205. In various exemplary embodiments, the first receipt information 210 includes cryptographic information relating to the original electronic record 205 and may include, for example, receipt information and identifying information added to the original electronic record 205 by the repository 160. As shown in FIGS. 2–3, cryptographic information, such as the first receipt information 210 and the actual digital signature, is shown in a "bold-framed" format.

Next, at least some first identifying information 215 is generated and appended at an end portion of the original electronic record 205. In various exemplary embodiments, the first identifying information 215 includes an un-encrypted message digest of the original electronic record 205 and a provable representation of the first receipt information 210. The first identifying information 215 may also include time-stamp information. In various exemplary embodiments, a digital time-stamp is attached to every original electronic record received in the repository 160. The original electronic record 205, with the prepended first receipt information 210 and the appended first identifying information 215 is then stored in the repository as an authoritative electronic record 220. The concatenated whole of all information prepended at the beginning portion of the original electronic record 205 may be referred to as the beginning information, while the concatenated whole of all information appended at the end portion of the original electronic record 205 may be referred to as the end information.

It should be noted that although the identifying information 215 includes a provable representation of receipt information 210, receipt information 210 cannot be recreated from identifying information 215. This one-way relationship and the fact that receipt information 210 is never sent to the remote location 110, prevents a duplicate copy of authoritative electronic record 220 being recreated at remote location 110.

The authoritative electronic record 220 remains in the repository until a request is received from one of the remote locations 110 to review and optionally sign the authoritative electronic record 220. When such a request is received, a complement of the proper subset of the authoritative electronic record 225 is computed at the repository. In this embodiment, the newly computed complement of the proper subset of the authoritative electronic record 225 comprises the original electronic record 205 and the appended first identifying information 215.

The complement of the proper subset of the authoritative electronic record 225 is transmitted, via the network 150, to the requesting remote location 110.

FIG. 3 shows a functional block diagram outlining a first exemplary embodiment of a method for digitally signing the authoritative electronic record 220 at a remote location 110, transmitting that digital signature to the repository 160, and using the digital signature to create a signed authoritative electronic record 245.

When the transmitted complement of the proper subset of the authoritative electronic record 225 is received at the remote location 110, the complement of the proper subset of the authoritative electronic record 225 may be displayed, stored, and/or printed at the remote location 110, so that a potential signatory may review the complement of the proper subset of the authoritative electronic record 225. Having reviewed and approved the complement of the proper subset of the authoritative electronic record 225, the signatory may decide to digitally sign the authoritative electronic record 220 maintained at the repository 160.

Before a digital signature can be added to the authoritative electronic record 220, a message digest of the authoritative electronic record 220 must be computed and made available at the remote location 110. The message digest of the authoritative electronic record 220 cannot be computed at the remote location because transmitting an exact copy of the information necessary to compute the required message digest at the remote location 110, specifically, transmitting the first receipt information 210, would destroy the uniqueness of the authoritative electronic record 220 stored in the repository 160. Thus, because the first receipt information 210 was not transmitted to the remote location 110, the required message digest cannot immediately be computed at the remote location 110.

Therefore, in order to maintain the uniqueness of the authoritative electronic record 220 in the repository 160, only a provable representation of the first receipt information 210 is transmitted to the remote location 110. The provable representation, as previously noted, is included in the first identifying information 215. Instead of computing the entire message digest of the authoritative electronic record 220 at the remote location 110, a partial message digest 230 is computed at the repository 160 on a proper subset of the authoritative electronic record 220. The message digest completed at the remote location 110 is computed using the partial message digest 230 and the complement of the proper subset of the authoritative electronic record 220. In this exemplary implementation, the computation is divided between the repository 160 computing a partial message digest 230 for the first receipt information 210 and the remote location 110 completing the computation of the message digest using the partial message digest 230 and the complement of the proper subset of the authoritative electronic record 225 (which is the combination of 205 and 215).

The partial message digest 230, which is based on the first receipt information 210, is computed at the repository 160. It should be understood that if the beginning information included information other than the first receipt information 210, all of the beginning information would be used to compute the partial message digest 230. The partial message digest 230 is composed of at least two pieces of information, the interim chaining values and the digital length in bits of the prepended beginning information.

The interim chaining values are computed in two steps. The first step involves padding to a known bit value the first receipt information 210 with the necessary bits to make the bit length of the first receipt information 210 an integer multiple of the data length as required by a hashing algorithm. The same hashing algorithm will also be employed to complete the message digest used in the desired digital signature at the remote location 110. The second step involves inputting the now padded bit stream of the first receipt information 210 into the hashing algorithm to produce the interim chaining values. This process of creating the chaining values is called "interim" because the final hashing of the entire authoritative electronic record 220 is not completed at the repository 160. Rather, this final hashing will be completed at the remote location 110.

Once the partial message digest 230 is computed in repository 160, the resulting partial message digest 230 must be transmitted to the remote location 110. The remote location 110 receives the partial message digest 230 and uses the partial message digest 230 to re-seed the same hashing algorithm mentioned above and finish generating a complete message digest by inputting the complement of the proper subset of the authoritative electronic record 225. The complete message digest represents the authoritative electronic record 220.

If the potential signatory, upon review and approval of the complement of the proper subset of the authoritative electronic record 225, decides to digitally sign the authoritative electronic record 220, the potential signatory uses his or her private key and the computed message to produce a digital signature 235, where the signed data may also include signatory identification information and optionally cryptographic information. In various exemplary embodiments, a small hardware token or smart card provides the private key and algorithms used by the signatory to create digital signatures. Alternatively, a software-based private key may be used.

Once the signatory's digital signature 235 is produced, the digital signature 235 along with any identification and cryptographic information is then transmitted to the repository 160 to be validated with the public key and a recomputed message digest of the authoritative electronic record 220, through standard digital signature validation techniques.

If it is determined that the digital signature 235 represents a valid digital signature, it is also determined that: the original electronic record 205 and first identifying information 215 in the repository 160 are the same as the original electronic record 205 and first identifying information 215 communicated to the remote location 110; the signatory at the remote location 110 utilized the private key necessary to digitally sign the authoritative electronic record 220; a digital signature was obtained for the authoritative electronic record 220, where the signed data included both the authoritative electronic record 220 and any signatory identifying information which may have been provided; the process of transmitting the original electronic record 205, the first identifying information 215, and partial message digest 230 from the repository 160 to the remote location 110 where the message digest was completed was successful; the process used to compute the digital signature 235 was performed correctly by the electronic device at the remote location 110; and, the process of transmitting the digital signature 235 and any identifying information from the remote location 110 to the repository 160 was successful.

Furthermore, if it is determined that the digital signature 235 represents a valid digital signature, the authoritative electronic record 220 in the repository 160 is amended to produce a signed authoritative electronic record 245. The signed authoritative electronic record 245 is produced by prepending the digital signature 235 to the first receipt information 210 of the authoritative electronic record 220, appending at least some further identifying information, which will be referred to as signature identifying information 240, to the first identifying information 215 of the authoritative electronic record 220, and storing the signed authoritative electronic record 245 in the repository 160.

In various exemplary embodiments, the signature identifying information 240 comprises any identifying information included as part of the signed data for the digital signature 235, the message digest used to produce the digital signature 235, and a time-stamp. In other exemplary embodiments, more or less information may be included in or excluded from the signature identifying information 240.

In various exemplary embodiments, further receipt information, which will be referred to as signature receipt information 250, such as, for example, cryptographic information relating to the signed authoritative electronic record 245, may be prepended to the signed authoritative electronic record 245.

Likewise, in various exemplary embodiments, further identifying information, which will be referred to as signature receipt identifying information 255, such as, for example, an un-encrypted message digest of the signed authoritative electronic record 245 and a provable representation of the signature receipt information 250, may be appended to the signed authoritative electronic record 245.

When signature receipt information 250 and signature receipt identifying information 255 are prepended and appended to the signed authoritative electronic record 245, the signed authoritative electronic record 245 is amended to produce a complete signed authoritative electronic record 260.

Once the complete signed authoritative electronic record 260 is produced, the authoritative electronic record 220 in the repository 160 is replaced by the complete signed authoritative electronic record 260, such that the complete signed authoritative electronic record 260 becomes what used to be the authoritative electronic record 220.

As further illustrated in FIG. 3, in various exemplary embodiments, the first receipt information 210, the digital signature 235, and the signature receipt information 250 are combined to create amended first receipt information 210, 235, and 250. The first identifying information 215, the signature identifying information 240, and the signature receipt identifying information 255 are combined to create amended first identifying information 215, 240, and 255. In this manner, if a request is received from an additional potential signatory at one of the remote locations 110 to review and optionally sign the complete signed authoritative electronic record 260, the procedure described above with reference to FIG. 2 may be used. It should be understood that in these exemplary embodiments, the amended first receipt information 210, 235, and 250 functions as the first receipt information 210 of FIG. 2, and the amended first identifying information 215, 240, and 255 functions as the first identifying information 215 of FIG. 2.

Figure 4:
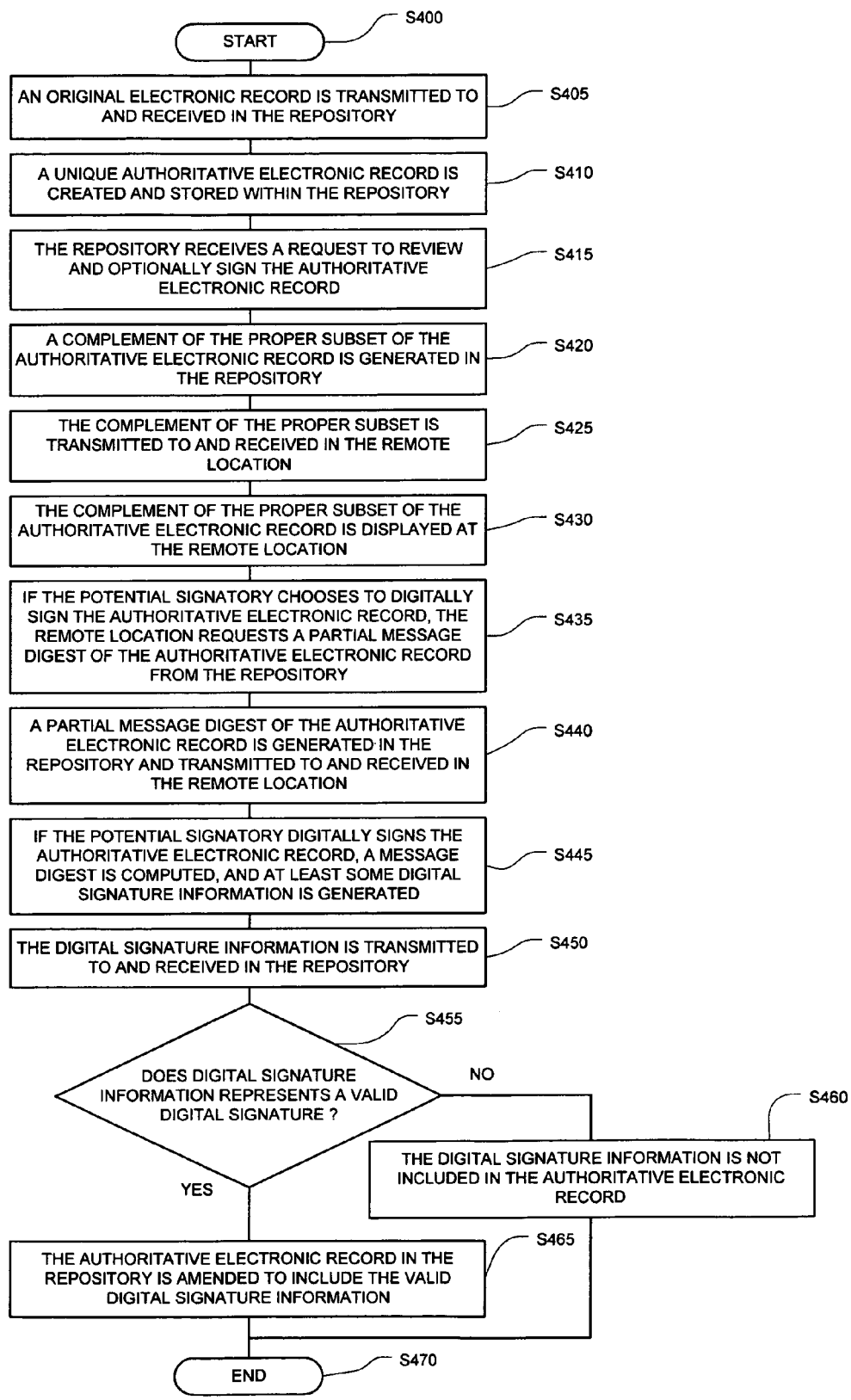
FIG. 4 is a flowchart outlining one exemplary embodiment of a method for creating, maintaining, digitally signing, and updating a unique authoritative electronic record, according to this invention.

FIG. 4 is a flowchart outlining one exemplary embodiment of a method for creating, maintaining, digitally signing, and updating a unique authoritative electronic record according to this invention. In various exemplary embodiments, the authoritative electronic record is stored in a repository that is capable of communicating, via a network, with at least one remotely located computer. In various exemplary embodiments, the repository represents a secure environment in which electronic records may be maintained. It should be appreciated that the repository will utilize sufficient security methods to ensure safe storage and integrity of the electronic records. Additionally, the network may be any known or later developed network, and the repository may communicate with the network and/or the remotely located computer via any known or later developed connection system or structure, including both wired and wireless connections.

As shown in FIG. 4, beginning in step S400, the method begins and control continues to step S405, wherein an original electronic record is transmitted from a remote location to a repository and received in the repository. Then, in step S410, a unique authoritative electronic record is created and stored within the repository. In various exemplary embodiments, the unique authoritative electronic record is created as further described herein. Control then continues to step S415.

In step S415, the repository receives a request to review and optionally sign the authoritative electronic record at a remote location. In response to the request, control continues to step S420, where a complement of the proper subset of the authoritative electronic record is generated in the repository. In various exemplary embodiments, the complement of the proper subset of the authoritative electronic record is generated as described above with reference to FIG. 2, and includes the original electronic record 205 and information appended at an end portion of the authoritative electronic record, such as, for example, identifying information 215.

Then, in step S425, the complement of the proper subset of the authoritative electronic record is transmitted to and received in the remote location.

Next, in step S430, the complement of the proper subset of the authoritative electronic record is displayed at the remote location such that a potential signatory may review and digitally sign the authoritative electronic record. If the potential signatory chooses to digitally sign the authoritative electronic record, control advances to step S435, where the remote location requests a partial message digest of the authoritative electronic record from the repository.

In response to the request, control continues to step S440, where the partial message digest of the authoritative electronic record is generated in the repository, transmitted to the remote location, and received by the remote location.

It should be appreciated that in order for the repository to add the potential signatory's digital signature information to the authoritative electronic record, a message digest must be computed at the remote location. Furthermore, both the partial message digest and the complement of the proper subset of the authoritative electronic record are necessary to compute a message digest at the remote location. Thus, the message digest cannot be computed until both components have been received by the remote location. Therefore, if both the complement of the proper subset of the authoritative electronic record and the partial message digest were previously generated, transmitted to, and received by the remote location, the remote location will not need to request the partial message digest of the authoritative electronic record from the repository, and steps S435 and S440 will not be necessary. However, if the partial message digest of the authoritative electronic record was not previously transmitted to the remote location, steps S435 and S440 will be necessary in order for the repository to add the potential signatory's digital signature information to the authoritative electronic record.

In step S445, if the potential signatory digitally signs the authoritative electronic record, a message digest is computed using the partial message digest and the complement of the proper subset of the authoritative electronic record, and at least some digital signature information is generated using the potential signatory's private key and the computed message digest. Control advances to step S450, where the digital signature information is transmitted to and received in the repository.

Next, in step S455, a determination is made whether the received digital signature information represents a valid digital signature. This can be accomplished, for example, using known PKI or PKC technology. If, in step S455 it is determined that the digital signature information does not represent a valid digital signature, control advances to step S460 and the digital signature information is not amended to the authoritative electronic record. It should be appreciated that other steps, such as returning a message to the potential signatory, reinitiating certain steps in the method, and/or initiating a different set of steps, may result if it is determined that the digital signature information does not represent a valid digital signature. Otherwise, if it is determined, in step S455, that the digital signature information represents a valid digital signature control jumps to step S465.

In step S465, the authoritative electronic record in the repository is amended to include the valid digital signature information. Then, in step S470, the method ends.

Figure 5:
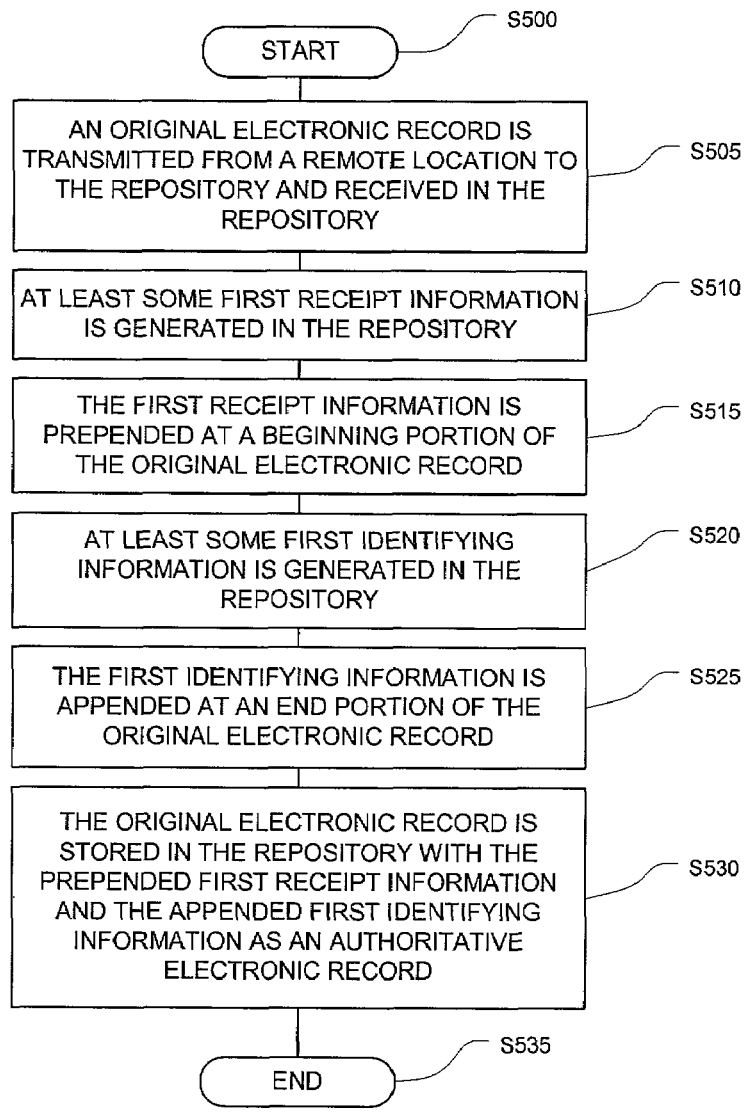
FIG. 5 is a flowchart outlining one exemplary embodiment of a method for creating and storing an original electronic record as an authoritative electronic record in a repository, according to this invention.

FIG. 5 is a flowchart outlining one exemplary embodiment of a method for storing an original electronic record as an authoritative electronic record in a repository, according to this invention. The steps of this exemplary embodiment may, for example, replace steps S405 through S410, as described above, with reference to FIG. 4.

As shown in FIG. 5, beginning in step S500, the method begins and control continues to step S505, wherein an original electronic record is transmitted from a remote location to the repository and received in the repository.

In step S510, at least some first receipt information, which includes information relating to the original electronic record, is generated in the repository. In various exemplary embodiments, the first receipt information includes at least a digital signature of the repository, which is generated for the original electronic record. Then, in step S515, the first receipt information is prepended at a beginning portion of the original electronic record. Control then continues to step S520.

In step S520, at least some first identifying information, which includes a provable representation of the first receipt information, is generated in the repository. The first identifying information may also include, for example, a time and/or date stamp or other information for identifying the original electronic record.

Then, in step S525, the first identifying information is appended at an end portion of the original electronic record. Control then continues to step S530.

In step S530, the original electronic record is stored in the repository with the prepended first receipt information and the appended first identifying information as an authoritative electronic record. Then, in step S535, the method ends.

Figure 6:
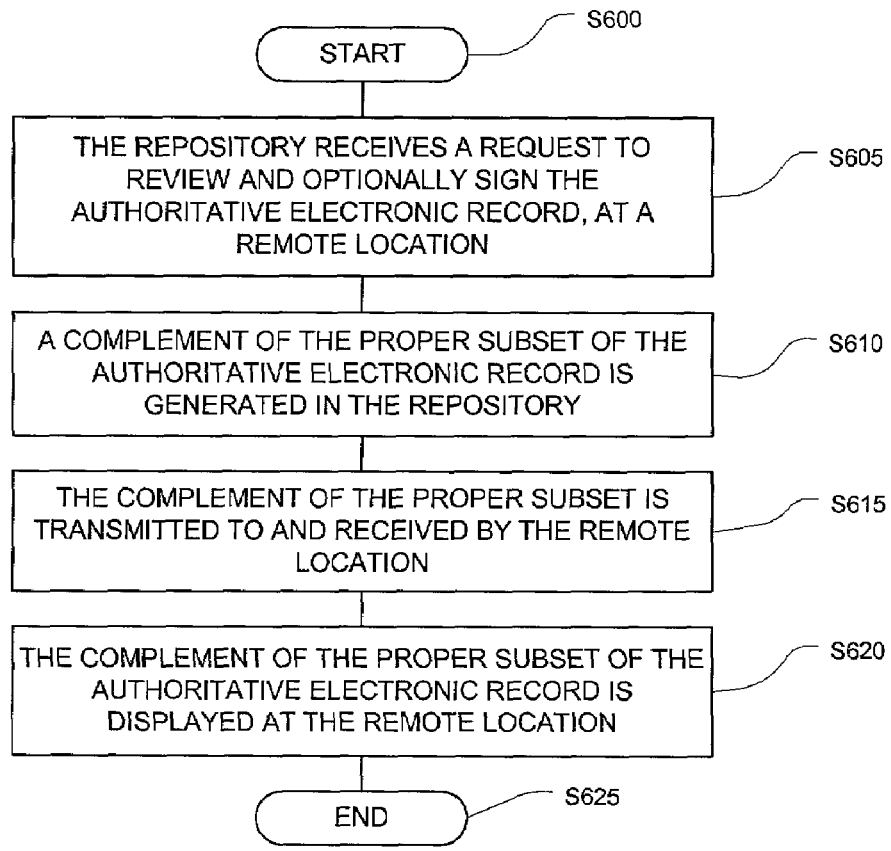
FIG. 6 is a flowchart outlining one exemplary embodiment of a method for transmitting a provable representation of an authoritative electronic record from a repository to a remote location, according to this invention.

FIG. 6 is a flowchart outlining one exemplary embodiment of a method for transmitting a copy of an authoritative electronic record from a repository to a remote location, according to this invention. The steps of this exemplary embodiment may, for example, replace steps S415 through S430, as described above, with reference to FIG. 4. In various exemplary embodiments, the authoritative electronic record includes at least some first receipt information prepended at a beginning portion of the authoritative electronic record, and at least some first identifying information, comprising a provable representation of the first receipt information, appended at an end portion of the original electronic record.

As shown in FIG. 6, beginning in step S600, the method begins and control continues to step S605, wherein a request to review and optionally sign an authoritative electronic record, at a remote location, is received by the repository. Control then continues to step S610.

In step S610, a complement of some proper subset of the authoritative electronic record is generated in the repository. In various exemplary embodiments, the complement of the proper subset of the authoritative electronic record is generated as described above with reference to FIG. 2, and includes the original electronic record and all of the appended identifying information. For example, the complement of the proper subset of the authoritative electronic record 220 would be the original electronic record 205 and identifying information 215, as shown in FIGS. 2 and 3. Thus, the complement of the proper subset of the authoritative electronic record constitutes a copy of the authoritative electronic record.

Then, in step S615, the complement of the proper subset of the authoritative electronic record is transmitted to and received by the remote location. Thus, the copy of an authoritative electronic record, as embodied by the complement of the proper subset of the authoritative electronic record, may be stored, viewed, printed, and/or later used when digitally signing the authoritative electronic record, by the potential signatory at a remote location, while the authoritative electronic record in the repository remains unique.

Control then continues to step S620, where the complement of the proper subset of the authoritative electronic record is displayed at the remote location, such that a potential signatory may review the authoritative electronic record (and possibly digitally sign the authoritative electronic record, using the complement of the proper subset and a partial message digest, in a later step). Then, control advances to step S625, where the method ends.

It should be understood that, in various other exemplary embodiments, the complement of the proper subset of the authoritative electronic record and the partial message digest (which are both needed to generate a signature for the authoritative electronic record at the remote location) may be transmitted to the remote location together in a single transmission, grouped in two transmissions, or individually in separate transmissions. For example, the complement of the proper subset of the authoritative electronic record may be transmitted to the remote location in response to the request received in step S605, while the partial message digest of the authoritative electronic record may not be returned from the repository until a potential signatory decides to digitally sign the authoritative electronic record and the remote location requests that the partial message digest be transmitted to the remote location, as further described herein, with reference to FIGS. 4 and 7. Alternatively, the partial message digest of a proper subset of the authoritative electronic record may be generated at the repository and transmitted to the remote location with the complement of the proper subset of the authoritative electronic record.

Figure 7:
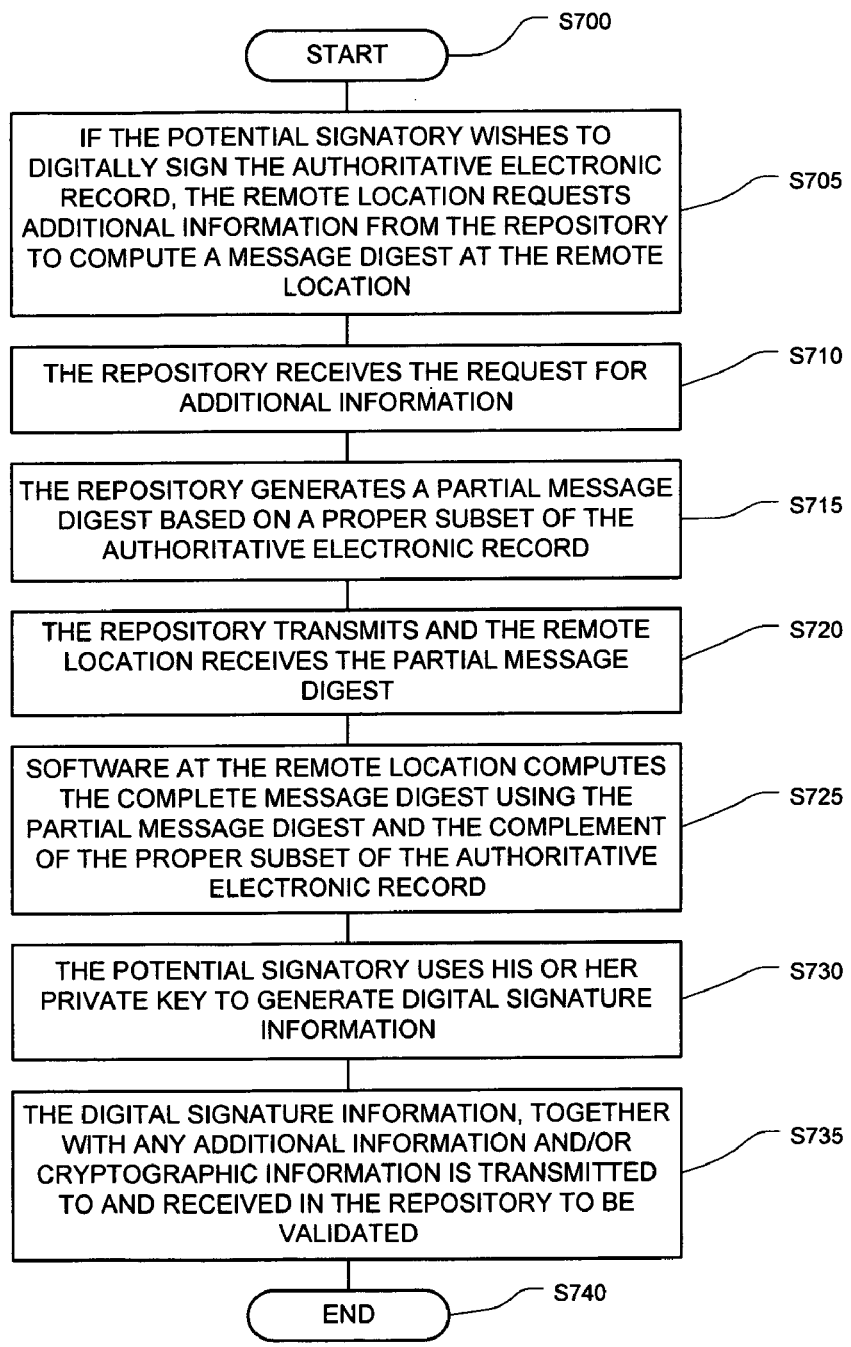
FIG. 7 is a flowchart outlining one exemplary embodiment of a method for creating at least some digital signature information, at a remote location, to be added to an authoritative electronic record, according to this invention.

FIG. 7 is a flowchart outlining one exemplary embodiment of a method for creating at least some digital signature information, at a remote location, to be added to an authoritative electronic record in a repository, according to this invention. The steps of this exemplary embodiment may, for example, replace steps S435 through S450, as described above, with reference to FIG. 4.

As shown in FIG. 7, beginning in step S700, the method begins and control continues to step S705, wherein a potential signatory wishes to digitally sign the authoritative electronic record and the remote location requests additional information from the repository. The additional information includes at least the partial message digest of the authoritative electronic record, because the partial message digest is necessary to compute a message digest at the remote location. The partial message digest comprises interim chaining values of any beginning information and information regarding the length of the beginning information.

In step S710, the repository receives the request for the additional information and control continues to step S715.

In step S715, the repository generates a partial message digest based on a proper subset of the authoritative electronic record, as described above. Then, in step S720, the repository transmits and the remote location receives the partial message digest. Control then continues to step S725.

It should be appreciated that both the partial message digest and the complement of the proper subset of the authoritative electronic record are necessary to compute a message digest at the remote location. Thus, the message digest cannot be computed until both components have been received by the remote location. Therefore, if both the complement of the proper subset of the authoritative electronic record and the partial message digest were previously generated, transmitted to, and received by the remote location, as discussed above, with respect to FIGS. 4 through 6, the remote location will not need to request the additional information, and steps S705 through S720 will not be necessary. However, if the complement of the proper subset was transmitted to the remote location but the partial message digest was not transmitted to the remote location, steps S705 through S720 will be necessary.

In step S725, software at the remote location uses the partial message digest and the complement of the proper subset of the authoritative electronic record to complete the message digest for the authoritative electronic record that was begun in the repository. It should be appreciated that the necessary software may reside at the remote location or be transferred to the remote location.

Then, in step S730, the potential signatory's private key is used to generate at least some digital signature information. It should be appreciated that the digital signature information is generated using the potential signatory's private key and the computed message digest. (Note that the data being signed may also include signatory identification information and/or cryptographic information.)

Control then continues to step S735, where the digital signature information, together with any additional information and/or cryptographic information, is transmitted to and received in the repository to be validated using standard digital signature validation techniques. Then, control advances to step S740, where the method ends.

Figure 8:
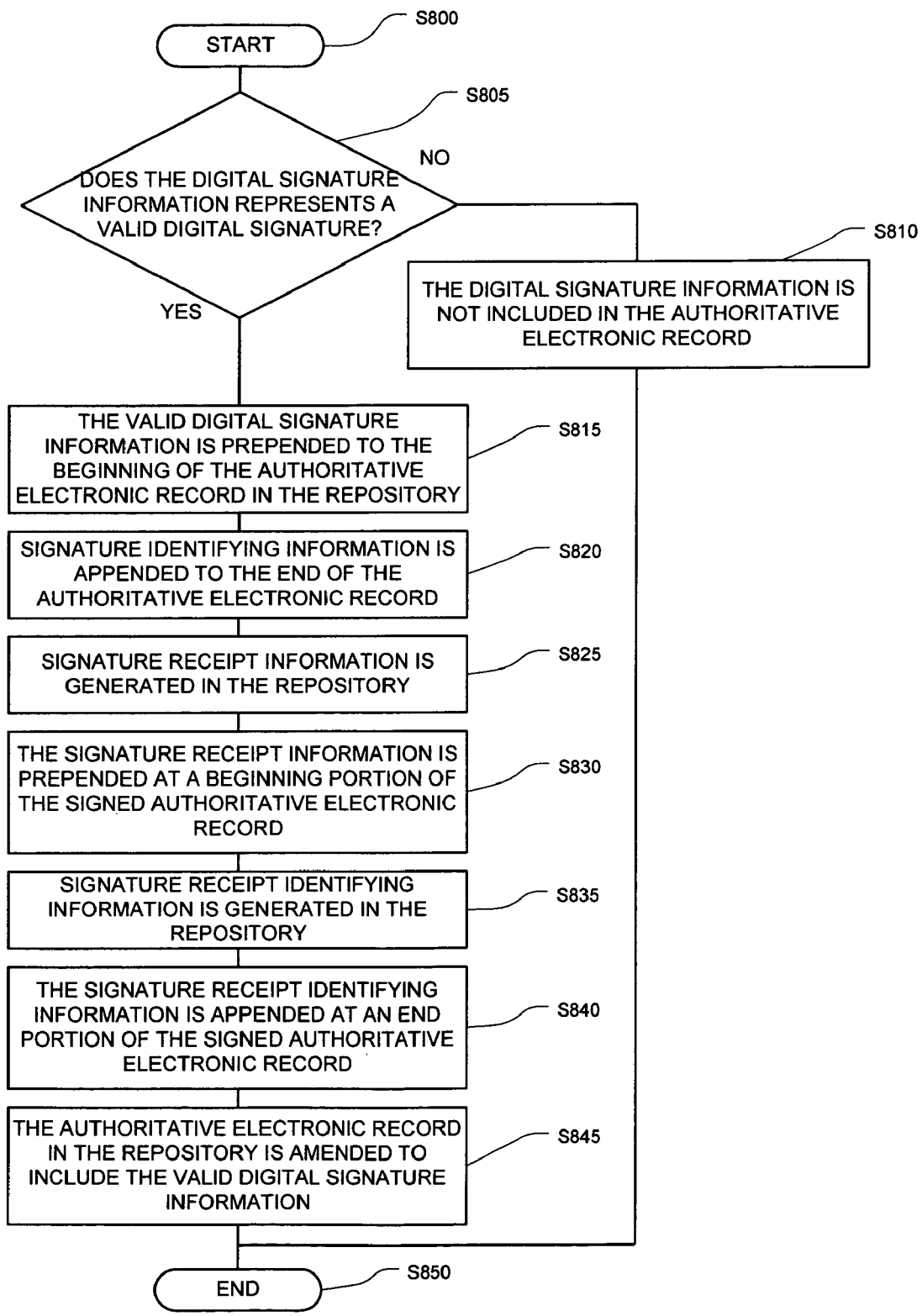
FIG. 8 is a flowchart outlining one exemplary embodiment of a method for amending an authoritative electronic record in a repository if received digital signature information is determined to be valid.

FIG. 8 illustrates the steps for amending an authoritative electronic record in a repository if some received digital signature information is determined to be valid. The steps of this exemplary embodiment may, for example, replace steps S455 through S465, as described above, with reference to FIG. 4. In various exemplary embodiments, digital signature information is validated by first computing a (single) message digest of the authoritative electronic record stored in the repository and any additional identifying information added by the signer and also included in his computation of the message digest.

Then, using this computed message digest of the authoritative electronic record, the digital signature information, and a corresponding public key, the digital signature information is validated using a validating algorithm (if the digital signature information is DSA-type digital signature information) or message digest comparison (if the digital signature information is RSA-type digital signature information). A validation or exact match indicates valid digital signature information. It should be appreciated that if a second potential signatory digitally signed and amended the same authoritative electronic record between the time the first potential signatory requested the record and the time the first potential signatory decided to sign and amend the electronic record, the systems and methods of this invention will detect the conflict when the first potential signatory attempts to amend the record because the digital signature will be invalid.

As shown in FIG. 8, beginning in step S800, the method begins and control continues to step S805, wherein a determination is made whether the digital signature information represents a valid digital signature. This can be accomplished, for example, using known PKI or PKC technology.

If, in step S805 it is determined that the digital signature information does not represent a valid digital signature, control advances to step S810 and the invalid digital signature information is not amended to the authoritative electronic record. It should be appreciated that other steps, such as returning a message to the potential signatory, reinitiating certain steps in the method, and/or initiating a different set of steps, may result if it is determined that the digital signature information does not represent a valid digital signature. Otherwise, if it is determined, in step S805, that the digital signature information represents a valid digital signature control jumps to step S815.

In step S815, the valid digital signature information is prepended to the beginning of the authoritative electronic record in the repository. Control then continues to step S820.

In step S820, at least some further identifying information, which will be referred to as signature identifying information, including a provable representation of the digital signature information, such as, for example, the message digest used to create the digital signature at the remote location, is appended at an end portion of the authoritative electronic record. The combination of the existing authoritative electronic record, the newly prepended digital signature information, and the newly appended signature identifying information, is referred to as the signed authoritative electronic record.

In step S825, at least some further receipt information, which will be referred to as signature receipt information, which includes information relating to the signed authoritative electronic record, is generated in the repository. In various exemplary embodiments, the signature receipt information includes a digital signature of the repository, which is generated for the signed authoritative electronic record. Then, in step S830, the signature receipt information is prepended at a beginning portion of the signed authoritative electronic record, such that the signature receipt information precedes the prepended digital signature information. Control then continues to step S835.

In step S835, at least some further identifying information, which will be referred to as signature receipt identifying information, and which corresponds to the signature receipt information created in step S825 and includes a provable representation of the signature receipt information, is generated in the repository. The signature receipt identifying information may also include, for example, a time and/or date stamp or other information for identifying the signed authoritative electronic record.

Then, in step S840, the signature receipt identifying information is appended at an end portion of the signed authoritative electronic record, such that this identifying information follows the signature identifying information appended at the end of the signed authoritative electronic record. Control then continues to step S845.

In step S845, the authoritative electronic record in the repository is amended to include the valid digital signature information. In various exemplary embodiments, the authoritative electronic record is also amended to include any additional appended or prepended information. It should also be understood that previous artifact original electronic records, receipts, digital signatures, and identifying information may also be maintained separately in the repository.

Control then advances to step S850, where the method ends.

It should be appreciated that the systems and methods of this invention may be implemented as software executing on a programmed general-purpose computer, a special purpose computer, a microprocessor, or the like. In various exemplary embodiments, the systems and methods of this invention may be implemented as a routine embedded in a network client, as a resource residing on a network server, or the like. The systems and methods of this invention may also be implemented by incorporation into a software and/or hardware system, such as the hardware or firmware systems of another personal digital assistant, bi-directional pager, analog or digital cellular phone or the like.

Thus, in summary, the systems and methods of this invention may be implemented on a programmed general purpose computer, a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4–8, can be used to implement the systems and methods of this invention.

While this invention has been described in conjunction with the exemplary embodiments outlined above, it is evident that many alternatives, modifications, and variations will be apparent to those skilled in the art. For example, a signed authoritative electronic record could be created with only one beginning information prepended and one ending information appended to the prior authoritative electronic record. Accordingly, the foregoing description of the these exemplary embodiments will reveal the general nature of the invention, such that others may, by applying current knowledge, readily modify and/or adapt for various applications these exemplary embodiments without departing from the spirit and scope of the invention. Therefore, such adaptations and modifications should and are intended to be comprehended within the meaning and range of equivalents of the disclosed exemplary embodiments. It is to be understood that the phraseology of terminology employed herein is for the purpose of description and not of limitation.

What is claimed is:

1. A method in a computer system for maintaining and digitally signing a unique, authoritative electronic record, the method comprising the steps of:

receiving an original electronic record in a repository;

generating at least some first receipt information, wherein the first receipt information includes information relating to the original electronic record, and wherein the first receipt information is prevented from being transmitted outside the repository;

prepending the first receipt information at a beginning portion of the original electronic record;

generating at least some first identifying information, wherein the first identifying information includes a provable representation of the first receipt information;

appending the first identifying information at an end portion of the original electronic record;

storing the original electronic record with the prepended first receipt information and the appended first identifying information in the repository as a unique, authoritative electronic record;

receiving a request to review and optionally sign the authoritative electronic record at a remote location;

computing a partially completed message digest of the authoritative electronic record, wherein the partially completed message digest is related to a proper subset of the authoritative electronic record;

computing a complement of the proper subset of the authoritative electronic record;

transmitting to the remote location the partially completed message digest of the authoritative electronic record;

transmitting to the remote location the complement of the proper subset of the authoritative electronic record;

completing the computation of the message digest of the authoritative electronic record, at the remote location, using the partially completed message digest of the authoritative electronic record and the complement of the proper subset of the authoritative electronic record;

displaying the complement of the proper subset of the authoritative electronic record at the remote location;

allowing the generation of at least some digital signature information at the remote location, wherein the digital signature information is generated using a private key and the message digest of the authoritative electronic record;

returning the digital signature information to the repository;

receiving the digital signature information in the repository;

determining whether the digital signature information represents a valid digital signature;

amending, if the digital signature information is determined to represent a valid digital signature, the authoritative electronic record to create a signed authoritative electronic record, wherein the signed authoritative electronic record comprises the authoritative electronic record and the digital signature information;

generating at least some additional receipt information, wherein the additional receipt information includes information relating to the signed authoritative electronic record;

prepending the additional receipt information at a beginning portion of the signed authoritative electronic record;

generating at least some additional identifying information, wherein the additional identifying information includes a provable representation of the additional receipt information;

appending the additional identifying information at an end portion of the signed authoritative electronic record; and storing the signed authoritative electronic record, the additional receipt information, and the additional identifying information, in the repository as the authoritative electronic record, wherein the signed authoritative electronic record includes the digital signature information.

2. The method of claim 1, wherein the step of generating at least some first identifying information further comprises the step of adding time-stamp information to the first identifying information, wherein the time-stamp information comprises the time and/or date when the original electronic record is received in the repository.

3. The method of claim 1, wherein the first receipt information includes at least some digital signature information that is generated using a private key of the repository.

4. The method of claim 1, wherein the proper subset of the authoritative electronic record comprises information which has been prepended at the beginning of the authoritative electronic record.

5. The method of claim 1, wherein the complement of the proper subset of the authoritative electronic record comprises the original electronic record and information which has been appended to the end of the original electronic record.

6. The method of claim 1, wherein the steps of transmitting to the remote location the partially completed message digest of the authoritative electronic record and transmitting to the remote location the complement of the proper subset of the authoritative electronic record include transmitting the partially completed message digest of the authoritative electronic record and transmitting the complement of the proper subset of the authoritative electronic record to the remote location in a single transmission.

7. The method of claim 1, wherein at least one software program associated with the repository is utilized at the remote location.

8. The method of claim 1, wherein the additional receipt information includes at least some digital signature information that is generated using a private key of the repository.

9. The method of claim 1, wherein the additional identifying information is generated using at least some repository information.

10. The method of claim 1, wherein the additional identifying information is generated using at least some user information.

11. The method of claim 1, wherein the additional identifying information is generated using at least some remote location information.

12. A method in a computer system for maintaining and digitally signing a unique, authoritative electronic record, the method comprising the steps of:

providing for the receipt of an original electronic record in a repository;

providing for the generation of at least some first receipt information, wherein the first receipt information includes information relating to the original electronic record, and wherein the first receipt information is prevented from being transmitted outside the repository;

providing for the prepending of the first receipt information at a beginning portion of the original electronic record;

providing for the generation of at least some first identifying information, wherein the first identifying information includes a provable representation of the first receipt information;

providing for the appending of the first identifying information at an end portion of the original electronic record;

providing for the storage of the original electronic record with the prepended first receipt information and the appended first identifying information in the repository as a unique, authoritative electronic record;

providing for the receipt of a request to review and optionally sign the authoritative electronic record at a remote location;

providing for the computation of a partially completed message digest of the authoritative electronic record, wherein the partially completed message digest is related to a proper subset of the authoritative electronic record;

providing for the computation of a complement of the proper subset of the authoritative electronic record;

providing for the transmission of the partially completed message digest of the authoritative electronic record to the remote location;

providing for the transmission of the complement of the proper subset of the authoritative electronic record to the remote location;

providing for the completion of the computation of the message digest of the authoritative electronic record, at the remote location, using the partially completed message digest of the authoritative electronic record and the complement of the proper subset of the authoritative electronic record;

providing for the display of the complement of the proper subset of the authoritative electronic record at the remote location;

providing for the allowance of the generation of at least some digital signature information at the remote location, wherein the digital signature information is generated using a private key and the message digest of the authoritative electronic record;

providing for the receipt of the digital signature information in the repository;

providing for the determination of whether the digital signature information represents a valid digital signature;

providing for the amendment, if the digital signature information is determined to represent a valid digital signature, of the authoritative electronic record to create a signed authoritative electronic record, wherein the signed authoritative electronic record comprises the authoritative electronic record and the digital signature information;

providing for the generation of at least some additional receipt information, wherein the additional receipt information includes information relating to the signed authoritative electronic record;

providing for the prepending of the additional receipt information at a beginning portion of the signed authoritative electronic record;

providing for the generation of at least some additional identifying information, wherein the additional identifying information includes a provable representation of the additional receipt information;

providing for the appending of the additional identifying information at an end portion of the signed authoritative electronic record;

providing for the storing of the signed authoritative electronic record additional receipt information, and the additional identifying information, in the repository as the authoritative electronic record, wherein the signed authoritative electronic record includes the digital signature information.

13. A method for displaying, at a remote location, a provable representation of a unique, authoritative electronic record stored in a repository, without compromising the uniqueness of the authoritative electronic record, the method comprising the steps of:

receiving a request to review and optionally sign at a remote location a unique, authoritative electronic record stored in a repository, wherein the authoritative electronic record includes at least some first receipt information, which has been prepended at a beginning portion of the authoritative electronic record, and at least some first identifying information, which has been appended at an end portion of the authoritative electronic record, wherein the first receipt information is prevented from being transmitted outside the repository, and wherein the first identifying information includes a provable representation of the first receipt information;

computing at the repository a complement of a proper subset of the authoritative electronic record, wherein the complement of the proper subset of the authoritative electronic record is a provable representation of the authoritative electronic record;

transmitting the complement of the proper subset of the authoritative electronic record to the remote location; and allowing the complement of the proper subset of the authoritative electronic record to be displayed at the remote location.

14. The method of claim 13, wherein the proper subset of the authoritative electronic record comprises information, which has been prepended at the beginning of the authoritative electronic record.

15. The method of claim 13, wherein the complement of the proper subset of the authoritative electronic record comprises the original electronic record and information, which has been appended to the end of the original electronic record.

16. The method of claim 13, wherein at least one software program associated with the repository is utilized at the remote location.

17. A method for generating a digital signature at a remote location for a unique, authoritative electronic record which resides in a repository, without compromising the uniqueness of the authoritative electronic record, the method comprising the steps of:

computing at the repository a complement of a proper subset of the authoritative electronic record;

transmitting to the remote location the complement of the proper subset of the authoritative electronic record;

computing at the repository a partially completed message digest of the authoritative electronic record, wherein the partially completed message digest is related to the proper subset of the authoritative electronic record;

transmitting to the remote location the partially completed message digest of the authoritative electronic record;

allowing the computation of the message digest of the authoritative electronic record to be completed at the remote location using the partially completed message digest of the authoritative electronic record and the complement of the proper subset of the authoritative electronic record; and allowing the generation of at least some digital signature information at the remote location, wherein the digital signature information is generated using a private key and the message digest of the authoritative electronic record.

18. The method of claim 17, further comprising the step of allowing the digital signature information to be returned to the repository.

19. The method of claim 17, wherein the proper subset of the authoritative electronic record comprises information which has been prepended at the beginning of the authoritative electronic record.

20. The method of claim 17, wherein the complement of the proper subset of the authoritative electronic record comprises the original electronic record and information which has been appended to the end of the original electronic record.

21. The method of claim 17, wherein the steps of transmitting to the remote location the complement of the proper subset of the authoritative electronic record and transmitting to the remote location the partially completed message digest of the authoritative electronic record include transmitting the complement of the proper subset of the authoritative electronic record and transmitting the partially completed message digest of the authoritative electronic record to the remote location in a single transmission.

22. The method of claim 17, wherein at least one software program associated with the repository is utilized at the remote location.

23. A method for including a valid digital signature, computed at a remote location, in a unique, authoritative electronic record stored in a repository, without compromising the uniqueness of the authoritative electronic record, wherein the authoritative electronic record includes at least some first receipt information which has been prepended at a beginning portion of the authoritative electronic record, and at least some first identifying information which has been appended at an end portion of the authoritative electronic record, wherein the first receipt information is prevented from being transmitted outside the repository, and wherein the first identifying information includes a provable representation of the first receipt information, the method comprising the steps of:

receiving in the repository at least some digital signature information, wherein the digital signature information was generated at a remote location using a private key and a message digest, wherein the message digest was computed using a partially completed message digest of the authoritative electronic record and a complement of a proper subset of the authoritative electronic record, wherein the partially completed message digest is related to the proper subset of the authoritative electronic record;

determining whether the digital signature information represents a valid digital signature;

amending, if the digital signature information is determined to represent a valid digital signature, the authoritative electronic record to create a signed authoritative electronic record, wherein the signed authoritative electronic record comprises the authoritative electronic record and the digital signature information; and storing the signed authoritative electronic record in the repository as the authoritative electronic record.

24. The method of claim 23, wherein the step of amending, if the digital signature information is determined to represent a valid digital signature, an authoritative electronic record to create a signed authoritative electronic record includes the steps of:

prepending digital signature information comprising a digital signature to the beginning portion of the authoritative electronic record; and appending digital signature information comprising a provable representation of the prepended digital signature information to the end portion of the authoritative electronic record.

25. The method of claim 23, wherein the step of amending, if the digital signature information is determined to represent a valid digital signature, an authoritative electronic record to create a signed authoritative electronic record includes the steps of:

prepending at least some signature receipt information to the beginning portion of the signed authoritative electronic record, wherein the signed authoritative electronic record already includes the digital signature information, and wherein the signature receipt information comprises information relating to the signed authoritative electronic record; and appending at least some identifying information to the end portion of the signed authoritative electronic record, wherein the signed authoritative electronic record already includes the digital signature information, and wherein the identifying information comprises a provable representation of the signature receipt information.

26. The method of claim 25, wherein the signature receipt information includes at least some digital signature information that is generated using a private key of the repository.

27. The method of claim 25, wherein the identifying information that is appended to the end portion of the signed authoritative electronic record is generated using at least some repository information.

28. The method of claim 25, wherein the identifying information that is appended to the end portion of the signed authoritative electronic record is generated using at least some user information.

29. The method of claim 25, wherein the identifying information that is appended to the end portion of the signed authoritative electronic record is generated using at least some remote location information.

30. The method of claim 25, wherein the identifying information that is appended to the end portion of the signed authoritative electronic record includes at least time and/or date information.

31. The method of claim 23, further including the steps of:

receiving a request, from a remote location, to review and optionally sign the signed authoritative electronic record stored in the repository, wherein the signed authoritative electronic record includes previously validated digital signature information;

computing at the repository a partially completed message digest of the signed authoritative electronic record, wherein the partially completed message digest is related to a proper subset of the signed authoritative electronic record;

computing at the repository a complement of the proper subset of the signed authoritative electronic record;

transmitting to the remote location the partially completed message digest of the signed authoritative electronic record;

transmitting to the remote location the complement of the proper subset of the signed authoritative electronic record;

allowing the computation of the message digest of the signed authoritative electronic record to be completed at the remote location using the partially completed message digest of the signed authoritative electronic record and the complement of the proper subset of the signed authoritative electronic record;

allowing the complement of the proper subset of the signed authoritative electronic record to be to be displayed at the remote location;

receiving in the repository at least some new digital signature information, wherein the new digital signature information was generated at the remote location using a private key and the message digest of the signed authoritative electronic record;

determining whether the new digital signature information represents a valid digital signature; and amending, if the new digital signature information is determined to represent a valid digital signature, the signed authoritative electronic record to include the new digital signature information.

32. A computer system for maintaining and updating a unique, authoritative electronic record, the system comprising:

means for receiving an original electronic record in a repository;

means for generating at least some first receipt information, wherein the first receipt information includes information relating to the original electronic record, and wherein the first receipt information is prevented from being transmitted outside the repository;

means for prepending the first receipt information at a beginning portion of the original electronic record;

means for generating at least some first identifying information, wherein the first identifying information includes a provable representation of the first receipt information;

means for appending the first identifying information at an end portion of the original electronic record;
means for storing the original electronic record with the prepended first receipt information and the appended first identifying information in the repository as a unique, authoritative electronic record;
means for receiving a request to review and optionally sign the authoritative electronic record at a remote location;
means for computing a partially completed message digest of the authoritative electronic record, wherein the partially completed message digest is related to a proper subset of the authoritative electronic record;
means for computing a complement of the proper subset of the authoritative electronic record;
means for transmitting to the remote location the partially completed message digest of the authoritative electronic record;
means for transmitting to the remote location the complement of the proper subset of the authoritative electronic record;
means for completing the computation of the message digest of the authoritative electronic record, at the remote location, using the partially completed message digest of the authoritative electronic record and the complement of the proper subset of the authoritative electronic record;
means for displaying the complement of the proper subset of the authoritative electronic record at the remote location;
means for allowing the generation of at least some digital signature information at the remote location, wherein the digital signature information is generated using a private key and the message digest of the authoritative electronic record;
means for receiving the digital signature information in the repository;
means for determining whether the digital signature information represents a valid digital signature;
means for amending, if the digital signature information is determined to represent a valid digital signature, the authoritative electronic record to create a signed authoritative electronic record, wherein the signed authoritative electronic record comprises the authoritative electronic record and the digital signature information;
means for generating at least some additional receipt information, wherein the additional receipt information includes information relating to the signed authoritative electronic record;
means for prepending the additional receipt information at a beginning portion of the signed authoritative electronic record;
means for generating at least some additional identifying information, wherein the additional identifying information includes a provable representation of the additional receipt information;
means for appending the additional identifying information at an end portion of the signed authoritative electronic record; and
means for storing the signed authoritative electronic record, the additional receipt information, and the additional identifying information, in the repository as the authoritative electronic record, wherein the signed authoritative electronic record includes the digital signature information.

33. A system for obtaining a digital signature from a remote location for a unique, authoritative electronic record, which resides in a repository, without compromising the uniqueness of the authoritative electronic record, the system comprising:
a software program that is capable of receiving a request to review, and optionally sign, at a remote location a unique, authoritative electronic record stored in a repository, wherein the authoritative electronic record includes at least some first receipt information which has been prepended at a beginning portion of the authoritative electronic record, and at least some first identifying information which has been appended at an end portion of the authoritative electronic record, wherein the first receipt information is prevented from being transmitted outside the repository, and wherein the first identifying information includes a provable representation of the first receipt information;
a software program that is capable of computing at the repository a complement of a proper subset of the authoritative electronic record;
a software program that is capable of computing at the repository a partially completed message digest of the authoritative electronic record, wherein the partially completed message digest is related to the proper subset of the authoritative electronic record;
a software program that is capable of controlling the transmission of the complement of the proper subset of the authoritative electronic record and the partially completed message digest of the authoritative electronic record to the remote location;
a software program that is capable of allowing the computation of the message digest of the authoritative electronic record to be completed at the remote location using the partially completed message digest of the authoritative electronic record and the complement of the proper subset of the authoritative electronic record;
a software program that is capable of allowing the complement of the proper subset of the authoritative electronic record to be displayed at the remote location; and
a software program that is capable of allowing the generation of at least some digital signature information at the remote location, wherein the digital signature information is generated using a private key and the message digest of the authoritative electronic record.

34. A system for including a valid digital signature, computed at a remote location, in a unique, authoritative electronic record stored in a repository, without compromising the uniqueness of the authoritative electronic record, wherein the authoritative electronic record includes at least some first receipt information which has been prepended at a beginning portion of the authoritative electronic record, and at least some first identifying information which has been appended at an end portion of the authoritative electronic record, wherein the first receipt information is prevented from being transmitted outside the repository, and wherein the first identifying information includes a provable representation of the first receipt information, the system comprising:
a software program that is capable of receiving in the repository at least some digital signature information, wherein the digital signature information was generated at a remote location using a private key and a message digest, wherein the message digest was computed using a partially completed message digest of the authoritative electronic record and a complement of a proper subset of the authoritative electronic record, wherein the partially completed message digest is related to the proper subset of the authoritative electronic record;

a software program that is capable of determining whether the digital signature information represents a valid digital signature;

a software program that is capable of amending, if the digital signature information is determined to represent a valid digital signature, the authoritative electronic record to create a signed authoritative electronic record, wherein the signed authoritative electronic record comprises the authoritative electronic record and the digital signature information; and a software program that is capable of storing the signed authoritative electronic record in the repository as the authoritative electronic record.

35. A computer program product for obtaining a digital signature on a single authoritative copy of an original electronic record comprising:

a computer usable medium and computer readable code embodied on the computer usable medium for obtaining a digital signature on a single authoritative copy of an original electronic record, the computer readable code comprising:

computer readable program code devices configured to cause the computer to effect the storing of an original electronic record as an authoritative electronic record in a repository;

computer readable program code devices configured to cause the computer to effect the transmission of a complement of a proper subset of the authoritative electronic record and a partially completed message digest of the authoritative electronic record, wherein the complement of the proper subset of the authoritative electronic record is a provable representation of the authoritative electronic record, and wherein the partially completed message digest of the authoritative electronic record is related to proper subset of the authoritative electronic record;

computer readable program code devices configured to cause the computer to effect the allowance of the generation of at least some digital signature information, wherein the digital signature information is produced using a computed message digest and a private key, wherein the computed message digest is generated using the partially completed message digest of the authoritative electronic record and the complement of the proper subset of the authoritative electronic record;

computer readable program code devices configured to cause the computer to effect the transmission of the digital signature information from the remote location to the repository and the receipt of the digital signature information in the repository;

computer readable program code devices configured to cause the computer to effect the amending, if the received digital signature information is determined to be valid, of the authoritative electronic record in the repository to include at least some of the received digital signature information.

* * * * *